United States Patent
Ludemann et al.

(10) Patent No.: US 9,642,416 B2
(45) Date of Patent: *May 9, 2017

(54) POLYURETHANE INJECTED BOOT ASSEMBLY AND ASSOCIATED MANUFACTURING METHOD

(71) Applicant: LaCrosse Footwear, Inc., Portland, OR (US)

(72) Inventors: John William Ludemann, Canby, OR (US); Justin Behnke, Portland, OR (US); Paul W. Brabson, Portland, OR (US); Aaron Barker, Portland, OR (US); Xiaojian Tong, Ningbo (CN)

(73) Assignee: LaCrosse Footwear, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/931,785

(22) Filed: Nov. 3, 2015

(65) Prior Publication Data
US 2016/0192730 A1 Jul. 7, 2016

Related U.S. Application Data

(63) Continuation of application No. 13/873,105, filed on Apr. 29, 2013, now Pat. No. 9,204,685, which is a
(Continued)

(51) Int. Cl.
*A43B 5/14* (2006.01)
*A43B 7/12* (2006.01)
(Continued)

(52) U.S. Cl.
CPC ................. *A43B 7/12* (2013.01); *A43B 1/10* (2013.01); *A43B 3/02* (2013.01); *A43B 5/145* (2013.01);
(Continued)

(58) Field of Classification Search
CPC .. A43B 7/12; A43B 1/10; A43B 23/02; A43B 23/0235; A43B 23/0205; A43B 23/026; A43B 5/145
(Continued)

(56) References Cited

U.S. PATENT DOCUMENTS 2,147,197 A * 2/1939 Glidden .................. A43B 1/02
36/3 A
2,200,333 A * 5/1940 Herzog .................... A43B 1/10
12/142 E
(Continued)

*Primary Examiner* — Marie Bays
(74) *Attorney, Agent, or Firm* — Perkins Coie LLP

(57) ABSTRACT

A footwear assembly having an upper that comprises a neoprene sock with a foot portion integrally connected to a leg portion. The foot portion has heel, vamp and under-foot portions. The leg portion has front shin, side wall, and rear calf-side portions. The upper has a unitary, outer, injection molded layer molded directly onto the foot and shin portions of the neoprene sock, while the sidewall and rear calf-side portions remain substantially uncovered by the injection molded layer. The injection molded layer encases the foot portion of the neoprene sock. The injection molded layer on the shin portion defines a shin guard portion having a necked down area integrally connected to the injection molded layer at the vamp portion, wherein the shin guard extends upwardly from the necked-down portion in an outwardly diverging shape away from the vamp.

19 Claims, 8 Drawing Sheets

Related U.S. Application Data continuation of application No. 13/685,619, filed on Nov. 26, 2012, now Pat. No. 8,984,776.

(60) Provisional application No. 61/565,359, filed on Nov. 30, 2011.

(51) Int. Cl.

| | | |
|---|---|---|
| *A43B 3/02* | (2006.01) | |
| *A43B 1/10* | (2006.01) | |
| *A43B 23/02* | (2006.01) | |
| *A43B 23/04* | (2006.01) | |
| *B29D 35/02* | (2010.01) | |
| *B29D 35/14* | (2010.01) | |
| *A43B 23/07* | (2006.01) | |
| *A43B 23/08* | (2006.01) | |
| *B29D 35/00* | (2010.01) | |
| *B29D 35/04* | (2010.01) | |

(52) U.S. Cl.
CPC ........ *A43B 23/0235* (2013.01); *A43B 23/042* (2013.01); *A43B 23/045* (2013.01); *A43B 23/07* (2013.01); *A43B 23/081* (2013.01); *B29D 35/0009* (2013.01); *B29D 35/02* (2013.01); *B29D 35/04* (2013.01); *B29D 35/146* (2013.01)

(58) Field of Classification Search
USPC .......... 36/131, 77 R, 30 R, 83, 84, 87, 72 R
See application file for complete search history.

(56) References Cited

U.S. PATENT DOCUMENTS

| | | | | |
|---|---|---|---|---|
| 3,091,871 A * | 6/1963 | Tronche | ............... | A43B 7/32 36/71 |
| 3,444,572 A * | 5/1969 | Broughton | ............... | A43B 7/32 12/142 E |
| 4,366,629 A * | 1/1983 | Scherz | ............... | A43B 7/32 36/108 |
| 4,563,825 A * | 1/1986 | Tesser | ............... | A43B 5/0427 36/118.9 |
| 4,693,021 A * | 9/1987 | Mazzarolo | ............... | A43B 7/08 36/131 |
| 4,778,145 A * | 10/1988 | Savori | ............... | A43B 23/082 249/83 |
| 4,778,368 A * | 10/1988 | Rebers | ............... | B29C 45/1635 264/328.8 |
| 4,897,939 A * | 2/1990 | Harrington | ............... | A43B 7/32 36/107 |
| 5,396,717 A * | 3/1995 | Bell | ............... | A43B 1/10 36/7.1 R |
| 5,647,150 A * | 7/1997 | Romanato | ............... | A43B 3/0084 12/142 R |
| 5,765,297 A * | 6/1998 | Cooper | ............... | A43B 7/32 36/107 |
| 7,350,321 B2 * | 4/2008 | Soon | ............... | A43B 1/14 12/142 E |
| 8,984,776 B2 * | 3/2015 | Ludemann | ............... | A43B 3/02 36/109 |
| 9,021,723 B2 * | 5/2015 | Meyer | ............... | A43B 7/125 36/10 |
| 9,204,685 B2 * | 12/2015 | Ludemann | ............... | A43B 3/02 |
| 2002/0012784 A1 * | 1/2002 | Norton | ............... | A43B 5/002 428/304.4 |
| 2004/0020077 A1 * | 2/2004 | Thomas | ............... | A43B 7/12 36/4 |
| 2007/0039210 A1 * | 2/2007 | Clark | ............... | A43B 1/0045 36/113 |
| 2009/0158621 A1 * | 6/2009 | Yamamoto | ............... | A43B 1/00 36/98 |
| 2010/0050470 A1 * | 3/2010 | Hubner | ............... | A43B 1/10 36/14 |
| 2010/0229429 A1 * | 9/2010 | Longuet | ............... | A43B 7/085 36/3 R |
| 2011/0078924 A1 * | 4/2011 | Rackiewicz | ............... | A43B 1/10 36/102 |
| 2013/0133227 A1 * | 5/2013 | Yu | ............... | A43B 23/0215 36/107 |
| 2013/0133229 A1 * | 5/2013 | Ludemann | ............... | A43B 3/02 36/109 |

\* cited by examiner

POLYURETHANE INJECTED BOOT ASSEMBLY AND ASSOCIATED MANUFACTURING METHOD

CROSS-REFERENCE TO RELATED APPLICATION

This application is a continuation of U.S. application Ser. No. 13/873,105, filed Apr. 29, 2013, which is a continuation of U.S. application Ser. No. 13/685,619, filed Nov. 26, 2012, which claims priority to and the benefit of U.S. Provisional Patent Application No. 61/565,359, titled Polyurethane Injected Boot Assembly and Associated Manufacturing Method, filed Nov. 30, 2011, all of which are incorporated herein in its entirety by reference thereto.

TECHNICAL FIELD

Embodiments of the present invention are directed to waterproof footwear, such as neoprene-based boots, and associated manufacturing methods.

BACKGROUND

Waterproof footwear, such as boots, are used in outdoor recreational activities as well as in a number of industrial and professional uses. For example, waterproof boots are often used in hunting and fishing to ensure that the sportsman's feet remain dry during the recreational activity. Additionally, waterproof boots are used in the animal husbandry and farming environments, as well as many other professional environments.

One type of waterproof boots includes over-the-calf boots made entirely of rubber. Other conventional waterproof boots include an outer rubber waterproof layer over an inner layer of supporting material. The use of rubber as the waterproof material can provide a number of functional benefits, because rubber of sufficient thickness is strong, resilient, puncture resistant, and fairly durable. Such rubber boots, however, are typically inflexible, heavy, and do not fit the wearer's foot and/or leg very well.

Other waterproof boots have been developed that include a neoprene inner layer fully covered by an outer layer of rubber vulcanized onto the neoprene. This neoprene and vulcanized rubber construction provides a light weight boot that fits better and is more comfortable than the all-rubber boots. The manufacturing process of laying up the rubber and vulcanizing it onto the outside of the neoprene sock is a fairly laborious manufacturing process, which can increase the boot's manufacturing cost. The heat applied to the boot assembly during the vulcanization process can also have a negative effect on the inner neoprene sock. For example, the neoprene may be susceptible to taking a set and losing elasticity during the vulcanization process. Accordingly, there is a need for an improved light weight, waterproof boot and associated method of manufacture.

SUMMARY

Boot assemblies and associated manufacturing methods in accordance with the present disclosure provide waterproof boots that overcome drawbacks of the prior art and that provide other benefits. In at least one embodiment, a boot assembly includes a neoprene sock having inner and outer surfaces, and an outer layer of injection molded material on selected portions of the neoprene sock's outer surface including on the heel area, the ankle area, the vamp area, the under-foot area, and the shin area. Other portions of the neoprene sock's outer surface remain uncovered by the injection molded material.

An aspect of the present disclosure provides a footwear assembly having an outsole and an upper connected to the outsole. The upper comprising a sock layer having a leg portion and a foot portion integrally connected to the leg portion. The leg portion has a front shin portion, side wall portions and a rear calf-side portion. The foot portion has a vamp portion; and a unitary outer injection molded layer molded directly onto at least a portion of the sock layer. The unitary outer injection molded layer comprises a first injection molded region that encases the foot portion of the sock layer. The injection molded layer has a second injection molded region on the shin portion of the leg portion of the sock layer, wherein the sidewall portions and calf-side portion of the sock layer remain exposed and substantially uncovered by the second injection molded layer, and wherein the second injection molded layer includes a shin guard having a necked down area and a shin area that is wider than the necked down area, the necked down area interconnecting the shin area and the vamp portion.

Another aspect of the present disclosure provides a lightweight, waterproof footwear assembly combinable with an outsole. The assembly comprises: an upper connectable to the outsole, and the upper has a sock including a foot portion and a leg portion integrally connected to the foot portion. The leg portion has a front shin portion, side wall portions and a rear calf-side portion. The upper has a unitary outer injection molded layer molded directly onto the foot portion of the sock and a first portion of the leg portion of the sock while second portions of the leg portion remain exposed and substantially uncovered by the outer injection molded layer. The injection molded layer encases the foot portion of the sock. The injection molded layer at the foot portion has a plurality of integral convertible channels of reduced thickness around the foot portion in a configuration conforming to a top edge of a boot, wherein the convertible channels define cut lines along which the upper can be cut during manufacture to define a top edge of a boot of a selected height.

Another aspect of the present disclosure provides a lightweight, waterproof footwear assembly, comprising an upper connected to an outsole. The upper has a sock that has a foot portion with an ankle portion, a heel portion, a vamp portion, and an under-foot portion. The sock has a leg portion integrally connected to the foot portion, and the leg portion has a front shin portion, side wall portions and a rear calf-side portion. A unitary outer injection molded layer is molded directly onto the foot portion of the sock and a first portion of the leg portion of the sock while second portions of the leg portion remain exposed and substantially uncovered by the injection molded layer. The injection molded layer encases the foot portion of the sock and defines a shin guard integrally connected to the injection molded layer of the foot portion.

Another aspect of the present disclosure provides a footwear assembly having an outsole and an upper connected to the outsole. The upper comprises a neoprene sock having foot and leg portions, and the foot portion is integrally connected to the leg portion. The foot portion has a heel portion, a vamp portion and an under-foot portion. The leg portion has a front shin portion, side wall portions, and a rear calf-side portion. The upper has a unitary outer injection molded layer molded directly onto the foot portion and the shin portion of the neoprene sock, while the sidewall portions and rear calf-side portion remain exposed and substantially uncovered by the injection molded layer. The injection molded layer encases the foot portion of the neoprene sock. The injection molded layer on the shin portion defines a shin guard portion having a necked down area integrally connected to the injection molded layer at the vamp portion, wherein the shin guard extends upwardly from the necked-down portion in an outwardly diverging shape away from the vamp.

Another aspect of the disclosure provides a lightweight, waterproof footwear assembly combinable with an outsole. The footwear assembly has an upper connectable to the outsole, and the upper comprises a neoprene sock having a foot portion integrally connected to a leg portion. The foot portion has an ankle portion, a heel portion, a vamp portion, and an under-foot portion. The leg portion has a front shin portion, side wall portions and a rear calf-side portion. The upper comprises a unitary outer injection molded layer molded directly onto the foot portion and a first portion of the leg portion of the neoprene sock while second portions of the leg portion remain exposed and substantially uncovered by the injection molded layer. The injection molded layer encases the foot portion of the neoprene sock. The injection molded layer at the foot portion has a plurality of integral convertible channels of reduced thickness around the ankle portion in a configuration conforming to a top edge of a boot. The convertible channels define cut lines along which the upper can be cut during manufacture to define a top edge of a boot of a selected height.

Another aspect of the disclosure provides a method of making a waterproof footwear assembly. The method comprises enclosing a neoprene sock in an injection molding assembly, wherein the neoprene sock comprises an interior area and an exterior surface facing away from the interior area. The neoprene sock has a foot portion integrally connected to a leg portion. The foot portion has a heel portion, a vamp portion and an under-foot portion. The leg portion has a front shin portion, side wall portions and a rear calf-side portion. The method includes injecting a flowable, injection moldable material into the molding assembly adjacent to the foot portion of the neoprene sock. The method includes forming an injection molded layer of the injection moldable material directly on a portion of the exterior surface of the neoprene sock, wherein the injection molded layer covers the foot portion and the front shin portion, and wherein the sidewall portions and the rear calf-side portion remain exposed and substantially uncovered by the injection molded layer. The method includes molding the injection moldable material onto a portion of an outsole connecting the outsole to the neoprene sock, wherein an under-foot portion of the injection moldable material interconnects the neoprene sock to the outsole.

DETAILED DESCRIPTION

The present disclosure describes waterproof boot assemblies and methods of manufacturing the boot assemblies in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
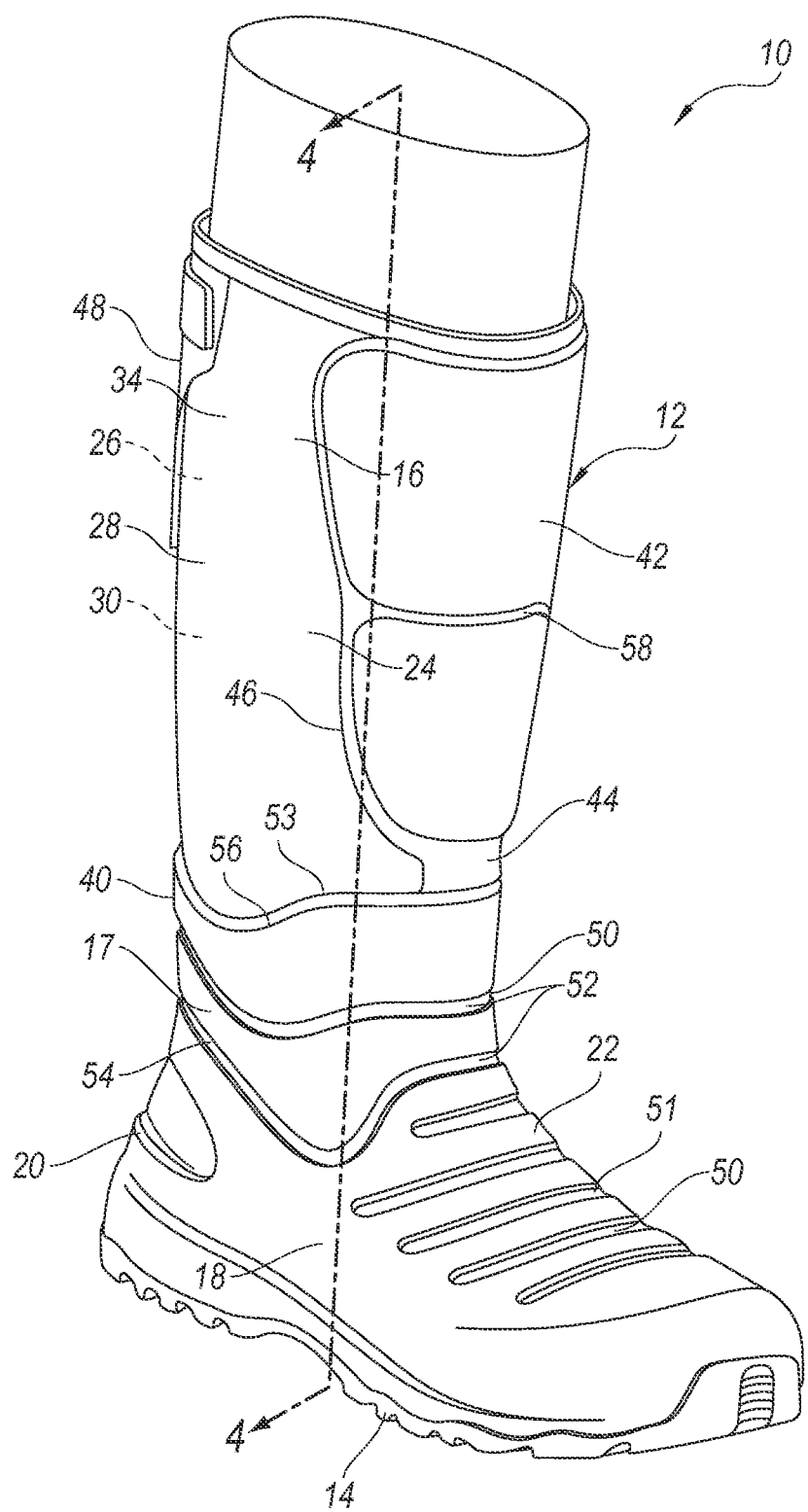
FIG. 1 is an isometric view of a waterproof boot assembly in accordance with an embodiment of the present disclosure.
Figure 2:
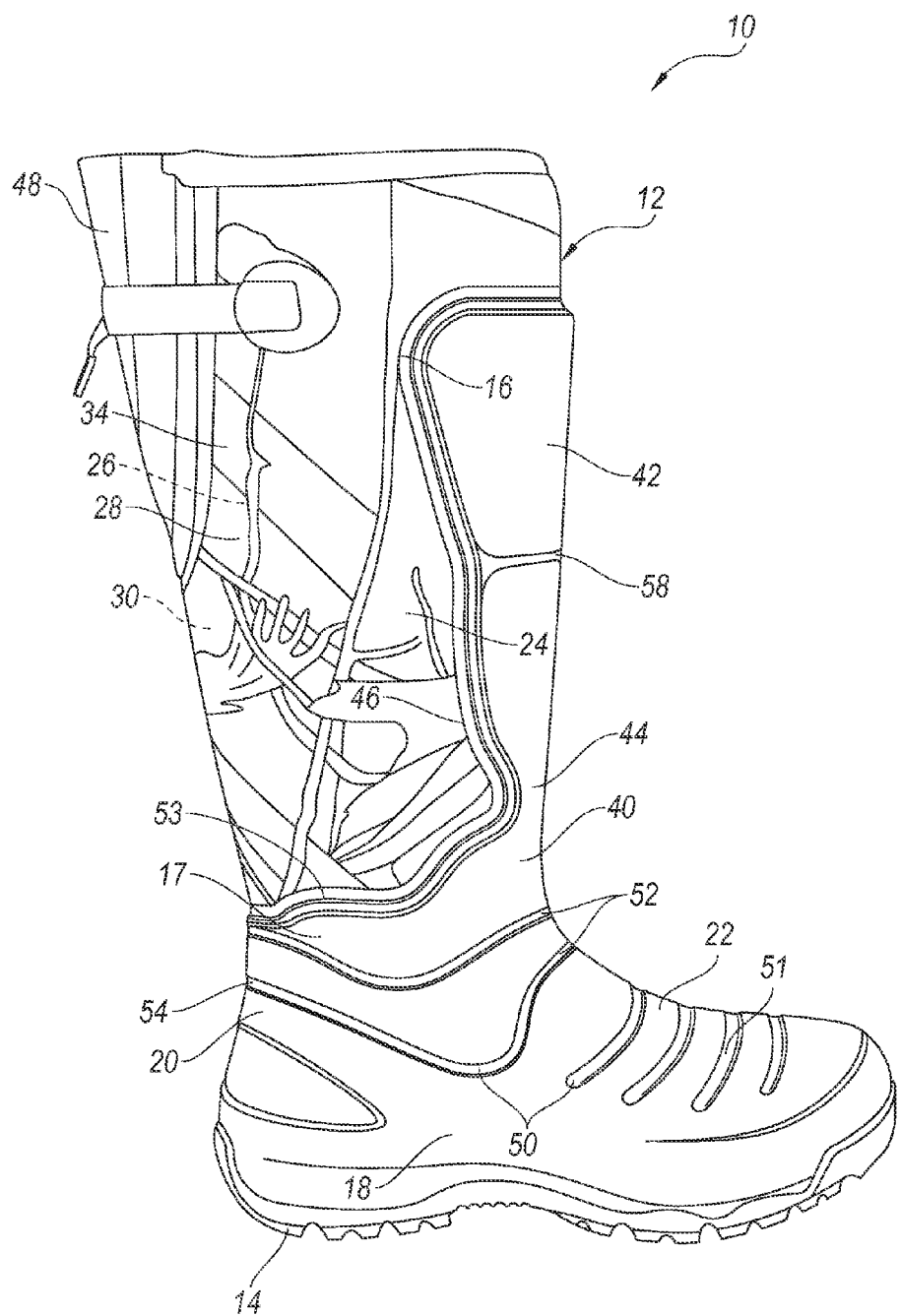
FIG. 2 is a side elevation photograph of an alternate embodiment of the boot assembly of FIG. 1.
Figure 3:
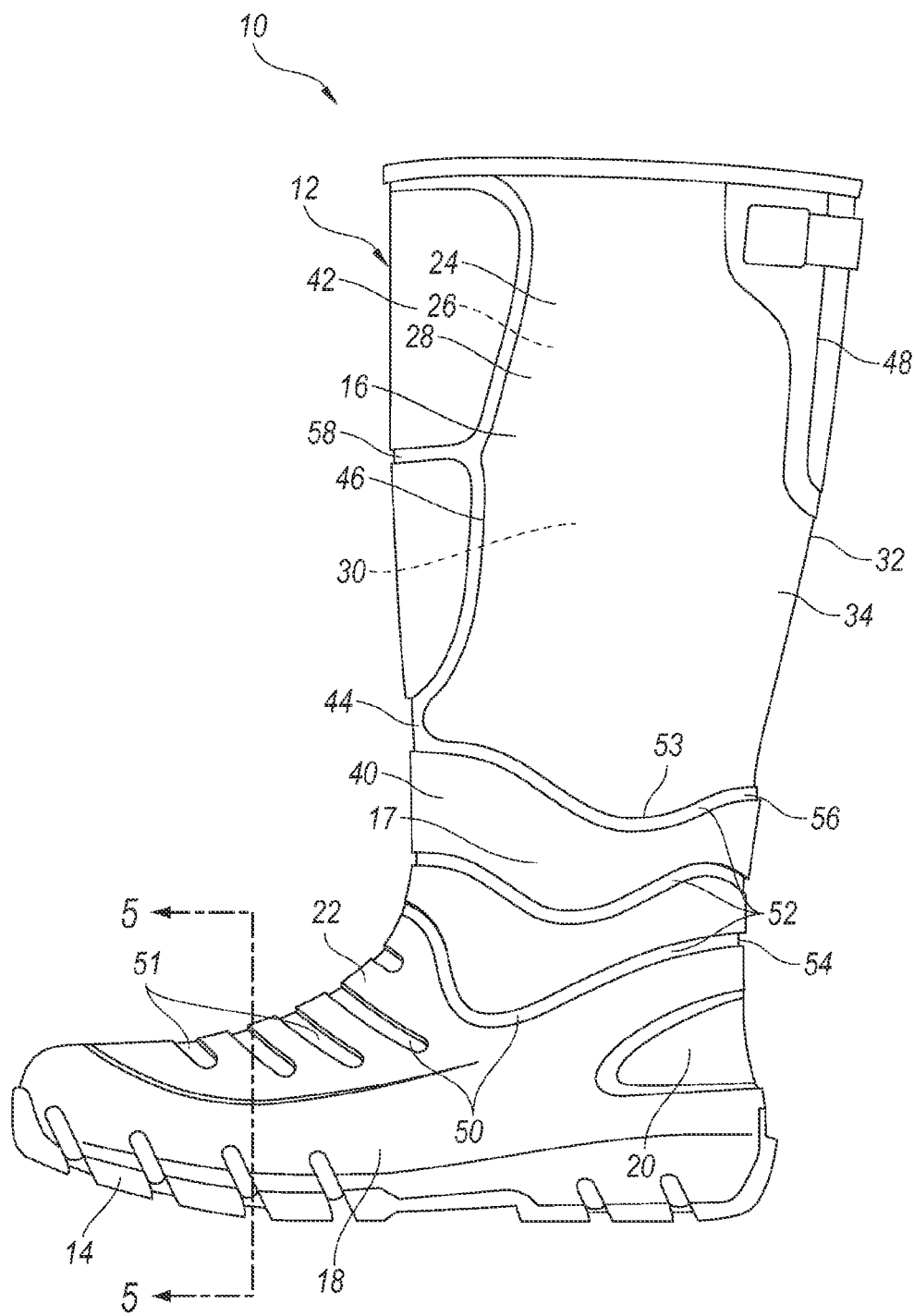
FIG. 3 is a side elevation view of the boot assembly of FIG. 1.

As seen in FIGS. 1-3, a waterproof boot assembly 10 in accordance with an embodiment of the present disclosure includes an upper 12 integrally connected to an outsole 14. The upper 12 is an over-the-calf upper that includes a leg portion 16 with an ankle portion 17 integrally connected to a foot portion 18, which has a heel portion 20 and a vamp portion 22. The upper 12 includes a full-foot neoprene sock 24 shaped and sized to receive the wearer's foot and to extend upwardly over the ankle and cover the wearer's shin and calf. The neoprene sock 24 has an inner layer 26, an outer layer 28, and a neoprene layer 30 sandwiched between the inner layer 26 and the outer layer 28. The inner layer 26 defines the interior area of the entire boot from the foot portion 18, through the ankle portion 17 and to the top of the leg portion 16. The inner layer 26 can be a fabric material, such as nylon, cotton, canvas, fleece, insulation, wool, mesh, or other selected materials.

The neoprene layer 30 carries the inner layer 26 and the outer layer 28. The neoprene layer of the illustrated embodiment has a thickness of approximately 3.5 mm. Other embodiments can include a neoprene layer with a thickness of approximately 7.0 mm. Yet other embodiments can include a neoprene layer with other thicknesses or a combination of thicknesses. The neoprene layer 30 of the illustrated embodiment is formed from two pieces of neoprene material. One piece forms the floor region upon which a wearer's foot is supported, and the second piece of neoprene is shaped to cover the vamp, heel, ankle and lower leg regions. The two pieces of neoprene can be connected to each other via stitching or other conventional techniques for joining pieces of neoprene together. In one embodiment, the floor region of the neoprene sock 24 is formed by a puncture resistance insole board, such as a LENZI® insole board or the like, to which the rest of the neoprene layer 30 is attached and/or stitched. In the illustrated embodiment, the second piece of the neoprene is stitched to itself to close the heel, ankle, and leg portions of the neoprene sock 24. In this arrangement, the neoprene sock 24 has a stitched seam 32 that extends vertically along the back side of upper (i.e., along the calf-side 34 of the leg portion 16) between the heel portion 20 and the top of the leg portion 16. Other embodiments can have a seam in other locations, such as along the top of the vamp portion 22 and along the front or shin-side 36 of the leg portion 16. In yet other embodiments, other configurations of the neoprene can be used to provide a seam in other locations.

The outer layer 28 can also be a fabric material securely affixed to the outer surface of the neoprene layer 30. The outer layer 28 can cover the entire neoprene layer. In other embodiments, the outer layer 28 can cover only selected portions of the neoprene layer, such as those portions of the neoprene sock 24 exposed and visible from exterior of the boot assembly 10, as discussed in greater detail below. The outer layer 28 can be a durable fabric material, such as Spandura®, nylon, cotton, canvas, fleece, wool, mesh, or other selected materials. The outer layer can also be one or more selected colors, and/or it can include camouflage, designs, images, indicia, or other visual features.

The upper 12 includes an outer polyurethane (PU) layer 40 injection-molded directly onto portions of the neoprene sock 24, while other portions of the neoprene sock remain uncovered (i.e., PU-free). The PU material can be injection molded directly onto the outer surface of the neoprene layer 30, or onto the outer surface of the outer layer 28, or both. The PU material is lightweight, durable, and has better insulative properties than vulcanized rubber. The injection-molded PU layer 40 is also permanently connected to the outsole 14 so as to fixedly connect the outsole 14 to the upper 12. In the illustrated embodiment, the injection-molded PU layer 40 fully covers the neoprene sock 24 in the vamp portion 22, the heel portion, 18 and the ankle portion 17. Other portions of the neoprene sock 24, such as the calf-side 34 and sidewalls of the leg portion 16, remain uncovered and exposed.

Figure 4:
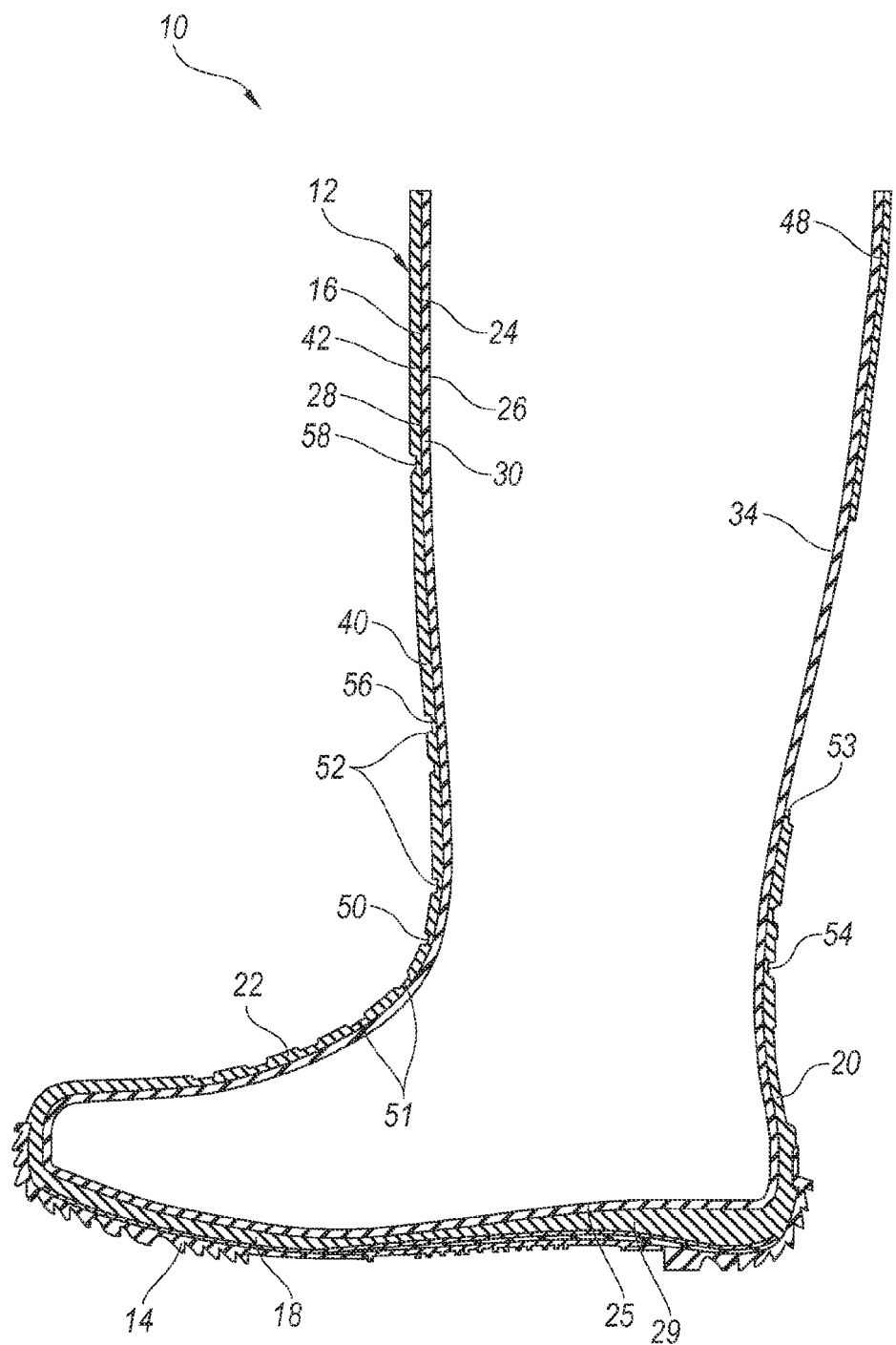
FIG. 4 is a cross-sectional view taken substantially along line 4-4 of FIG. 1.
Figure 5:
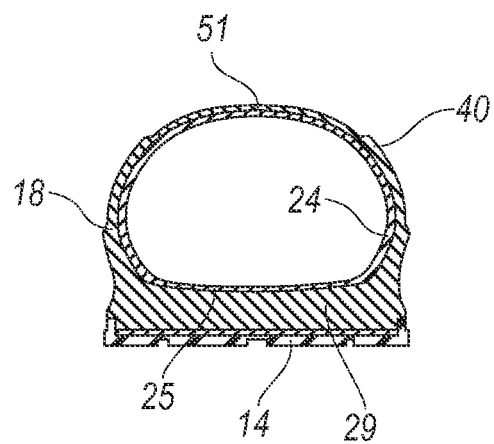
FIG. 5 is a cross-sectional view taken substantially along line 5-5 of FIG. 3.

As shown in FIGS. 4 and 5, the injection-molded PU material is molded around the entire foot portion of the neoprene sock 24, such that the PU material extends under the bottom of the neoprene sock between the sock's bottom panel 25 and the outsole 14. This "under-foot" layer of PU material between the neoprene sock 24 and the outsole 14 is sufficiently thick to define a cushioning and/or shock attenuation layer under the wearer's foot, so as to effectively act as an integrated midsole portion 29 to which the outsole 14 is attached. The integrated PU midsole portion 29 can have varying thicknesses under the foot to achieve selected performance or comfort objectives. In one embodiment, the integrated PU midsole portion 29 can be thicker in the heel area to absorb or otherwise reduce impact loads at heel strike of the wearer's gait cycle. The integrated PU midsole portion 29 can be configured in the arch area to essentially encapsulate a shank positioned under the neoprene sock's bottom panel 25 in the arch area. In another embodiment, the shank can be positioned between the outsole 14 and the midsole portion 29. In yet another embodiment can include the shank fully encapsulated within the midsole portion 29. Accordingly, the injection molded PU material on the neoprene sock 24 can also include the integral midsole portion underfoot, which is formed in the same single injection molding process, discussed in greater detail below.

The injection molded PU material can also be configured with a selected thickness over the vamp portion 22 to provide impact protection to the instep and/or metatarsal regions of the wearer's foot. In one embodiment, each of the neoprene layer and the PU material have cushioning and shock attenuation characteristics. The combination of the neoprene layer and the PU material layer at the vamp portion 22 can be configured with a selected thickness to form an integrated metatarsal guard construction that provides sufficient shock absorption and impact abatement to meet or exceed the ANSI and/or ASTM metatarsal guard requirements for footwear. Accordingly, the resulting footwear assembly 10 can be a certified metatarsal guard footwear assembly. In one embodiment, such metatarsal guard protection can be provided using a neoprene sock with a thickness of approximately 3.5 mm and the PU material having a thickness of approximately 4 mm-8 mm at least at the vamp portion. In one embodiment, the PU material has a thickness of approximately 6 mm at the vamp portion and/or the shin guard portion. Other embodiments can use other thicknesses of the neoprene sock and/or the PU material to provide the selected metatarsal guard construction.

In another embodiment, a metatarsal guard insert 55 can be provided over the vamp portion 22 of the neoprene sock prior to injection molding the PU material onto the neoprene sock 24. When the PU material is injection molded onto the neoprene sock 24, the metatarsal guard insert 55 is fully covered and/or encapsulated within the PU material. In this construction, the metatarsal guard insert 55 may or may not be visible from the exterior of the footwear assembly 10.

A similar construction may be provided with a toe guard insert 57 covered by the PU material. A toe guard insert 57, such as a certified non-metallic toe cap, can be positioned over the toe area of the neoprene sock 24 prior to injecting the PU material onto the neoprene sock 24. When the PU material is injected onto the neoprene sock 24, the toe guard insert 57 Is fully covered and/or encapsulated by the PU material layer. The result is a lightweight, highly insulative, boot or shoe having the certified toe guard protection.

In yet another embodiment, a puncture resistant layer 59 can be provided along the bottom of the neoprene sock (i.e., under foot). The puncture resistant layer 59 can be a metallic or nonmetallic material that provides sufficient puncture resistance in accordance with the ANSI or ASTM standards or other similar performance standard for footwear. At least one embodiment includes a puncture resistant material manufactured by LENZI®. The puncture resistant material can be part of an insole board. The puncture resistant layer 59 can be positioned adjacent to the bottom of the neoprene sock 24, and then the PU material is injection molded onto the neoprene sock, so the puncture resistant material is fully covered and/or encapsulated by the PU material. The result is a lightweight, durable, certifiable puncture-resistant footwear assembly that meets or exceeds manufacturing, performance and safety requirements and regulations for footwear.

The PU layer 40 also forms a shin guard 42 on the shin side 36 of the leg portion 16. The shin guard 42 has a narrow or necked-down area 44 integrally connected to the PU material on the front of the ankle portion 17 above the vamp portion 22. The shin guard 42 extends upwardly from the necked-down area 44 in an outwardly diverging shape to the top edge of the leg portion 16. The integral shin guard 42 terminates along side edge portions 46 so that the front of the upper 12 protects the wearer's shin, while the sides of upper 12 are PU-free with the neoprene sock 24 uncovered and exposed. The necked-down portion 44 at the bottom of the shin guard 42 helps maintain flexibility and comfort of the boot's leg portion 16, while providing a path through which the PU material can flow from the vamp and ankle portions to the shin guard area during the injection molding process, discussed in greater detail below. In one embodiment, the PU material is injected into the mold (discussed below) near the toe portion of the neoprene sock 24 so the PU material substantially simultaneously flows around the foot portion of the neoprene sock and along the shin portion. In other embodiments, the PU material can be initially injected into the mold adjacent to a different portion of the neoprene sock during the molding process.

The embodiment(s) described herein and shown in the figures include the layer of PU material injection molded onto the selected portions of the neoprene sock. Other embodiments can utilize other suitable flowable, injection moldable materials, such as thermoplastic polyurethane (TPU), Styrene Ethylbutylene Styrene (SEBS), or other suitable flowable injection-moldable material that can be injection molded directly onto selected portions of the neoprene sock 24 in a single molding process.

The injection molded layer 40 can be any of a range of colors or combination of colors. The PU layer 40 in other embodiments can include a selected camouflage pattern. In yet other embodiments, the injection-molded layer 40 other may be transparent or semi-transparent, so that portions of the neoprene sock 24 under the injection molded layer can be visible. As an example, one embodiment the neoprene sock 24 includes a camouflage pattern over most of its outer surface, and the injection molded layer is made of a clear TPU or clear SEBS material so virtually all the camouflage pattern of the neoprene sock 24 is visible to the user, including through the injection molded layer.

In the illustrated embodiment, the leg portion 16 of the upper 12 includes a gusset 48 on the calf-side 34 of the leg portion. The rest of the neoprene sock 24 above the ankle portion 17 on the calf-side 34 is exposed and not covered by the injection-molded PU material. The gusset 48 can be formed of a neoprene material, rubber, or other suitable flexible material to accommodate the stresses and folding forces applied to the gusset. The edges of the gusset 48 can be stitched directly to the top area of the leg portion, thereby creating a one or more seams between the gusset and the upper's leg portion. The seam(s) 32 along the calf-side 34 of the leg portion 16 can be sealed by a strip of vulcanized rubber, waterproof tape or other suitable waterproof covering. In another embodiment, a flowable sealant, such as a flowable rubber, can be applied to the seam and allowed to dry or cure to provide a waterproof covering over the seam(s). In another embodiment, a strip of PU material can be injection molded directly onto to neoprene sock 24 during the single-shot injection-molding process so as to cover and waterproof the entire seam 32. This seam-covering strip of PU material is integrally connected to the injection-molded PU material of the ankle portion 17 above the heel portion 20. While the illustrated embodiment includes the gusset 48, the upper 12 in other embodiments does not include a gusset 48. In such a configuration, the seam-covering strip of PU material can extend all the way to the top edge of the upper. In other embodiments, the leg portion 16 can include a zipper or other expandable/closeable entry system at the top of the leg portion that can help facilitate taking the boot assembly on and off of the wearer's foot/leg. Such entry system can be gusseted systems or gusset-free systems.

As seen in FIGS. 1-4, the injection molded PU layer 40 has a plurality of channels 50 formed into the PU material. The channels 50 are provided in the vamp portion 22, the ankle portion 17, the heel portion 20, and the shin guard 42. These channels 50 define areas of the PU material having reduced thicknesses, which decreases the overall weight of the boot assembly. In one embodiment, the PU layer at the channels has a thickness of approximately 2 mm, and the thickness of approximately 4 mm away from the channels 50. Other embodiments can have injection-molded PU material with different thicknesses. The channels 50 can also define flex grooves 51 in portions of the upper 12 that allow the upper 12 to bend or flex during use. For example, the flex grooves 51 in the vamp portion 22 and in the front of the ankle portion 17 allow the upper 12 to flex easily to accommodate for the movement of the wearer's lower leg, ankle, and foot while walking or running.

Figure 6:
FIGS. 6-8 are side elevation views of alternate embodiments of the boot assembly of FIG. 1.
Figure 6:
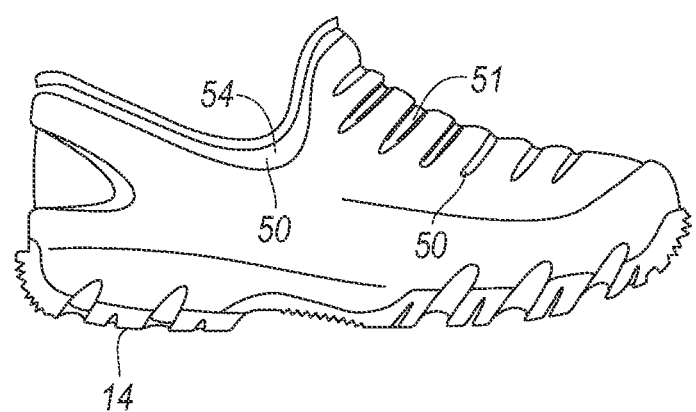

The boot assembly 10 of the illustrated embodiment is a full, over-the-calf boot having a height of, as an example, sixteen or eighteen inches from the bottom of the outsole 14 to the top edge 53 of the leg portion 16. The boot assembly 10 is configured as a convertible boot assembly that can be finished during the manufacturing process as either the full over-the-calf boot or as a shorter boot/shoe. The injection-molded PU layer 40 is formed over the neoprene sock 24 with a plurality of the channels 50 being convertible channels 52 extending around the upper 12. The convertible channels 52 define areas along which the upper 12 can be cut to shorten the upper and then finished during the manufacturing process to form shorter footwear. For example, FIGS. 3 and 6 show the convertible channels 52 that include a lower convertible channel 54 formed in the PU layer 40 around the upper 12 just below the ankle portion 17. After the PU layer 40 is injection molded onto the neoprene sock 24, the upper 12 can be cut along the lower convertible channel 54 and the top edge of the upper is finished, such as with a binding stitch, to form a 4.5-inch slip-on waterproof shoe (FIG. 6), referred to as a "camp moc."

Figure 7:
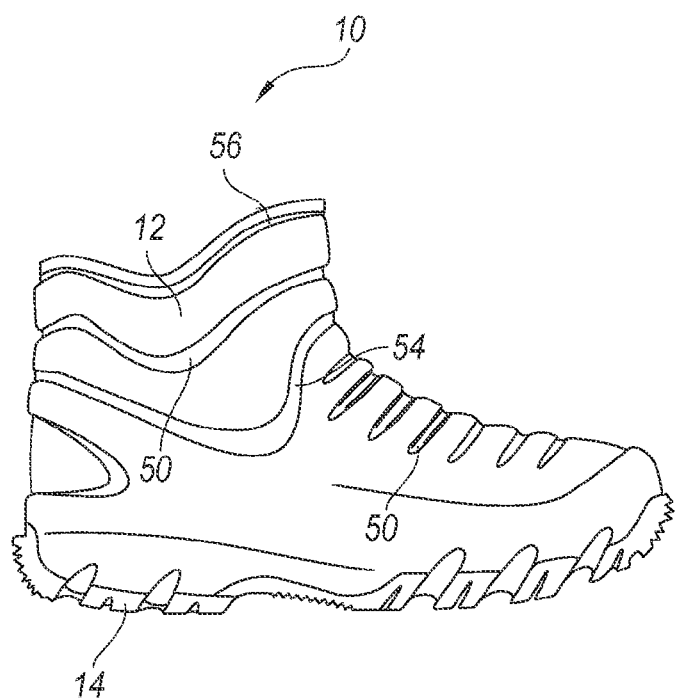
Figure 8:
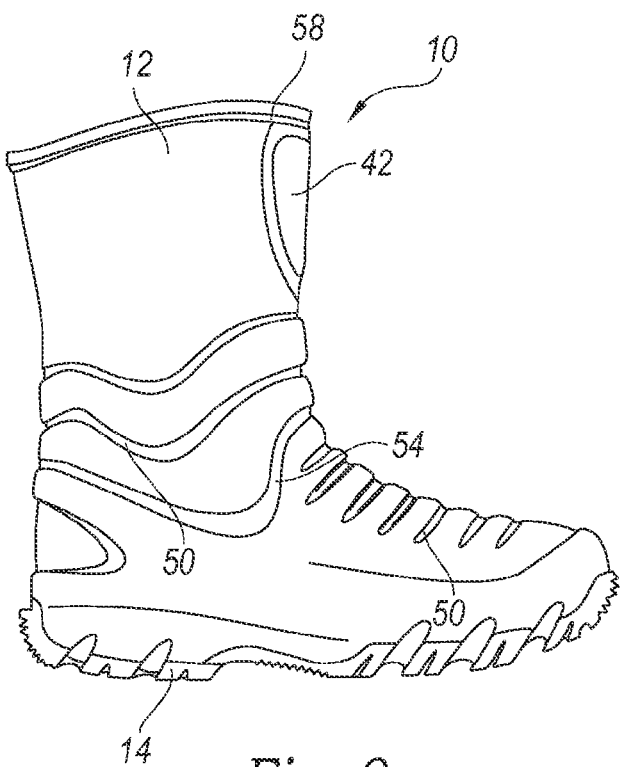

FIGS. 3 and 7 show the convertible channels 52 that include a 7-inch convertible channel 56 formed in the PU layer 40 around the upper 12 just below the shin guard 42 (FIG. 3) and along the top edge of the rest of the injection molded PU layer 24. The upper 12 can be cut along the 7-inch convertible channel 56 and the top edge of the upper is finished with a binding stitch or the like to form a 7-inch slip-on waterproof boot (FIG. 7). FIGS. 3 and 8 show the convertible channels 52 that include a 12-inch convertible channel 58 formed in the PU layer 40 in the shin guard 42 between the necked portion 44 and the top edge 53 of the leg portion 16. The upper 12 can be cut along the 12-inch convertible channel 58 and the top edge of the remaining upper 12 is finished with a binding stitch or the like to form a 12-inch waterproof boot (FIG. 8). The 12-inch waterproof boot of the illustrated embodiment includes portions of the neoprene sock 24 above the PU layer 40 that remain exposed and uncovered by the PU material.

While the illustrated embodiments are shown with convertible channels 52 that include at least the lower convertible channel 5.4-inch, the 7-inch convertible channel 56, and the 12-inch convertible channel 58, the boot assembly 10 can include a greater or fewer number of convertible channels 52 in different positions and/or orientations along which the upper 12 can be cut and finished to form footwear of different heights. This configuration allows the same mold to be used in the manufacturing of a plurality of boot assemblies having different heights, which can increase efficiency and reduce the manufacturing cost.

Figure 9:
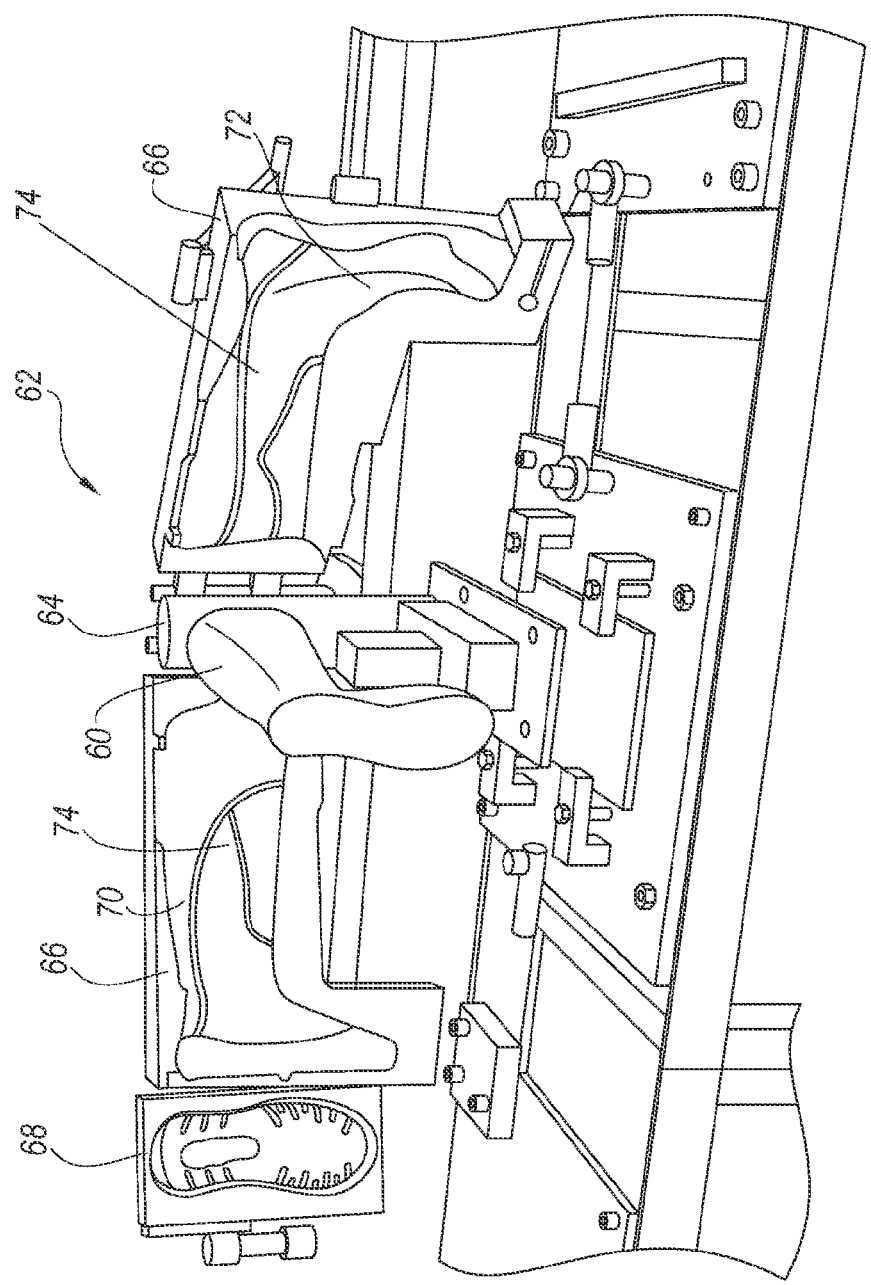
FIG. 9 is an isometric view of a mold assembly used in manufacturing the boot assembly of FIG. 1; the mold assembly is shown in an open position.
Figure 10:
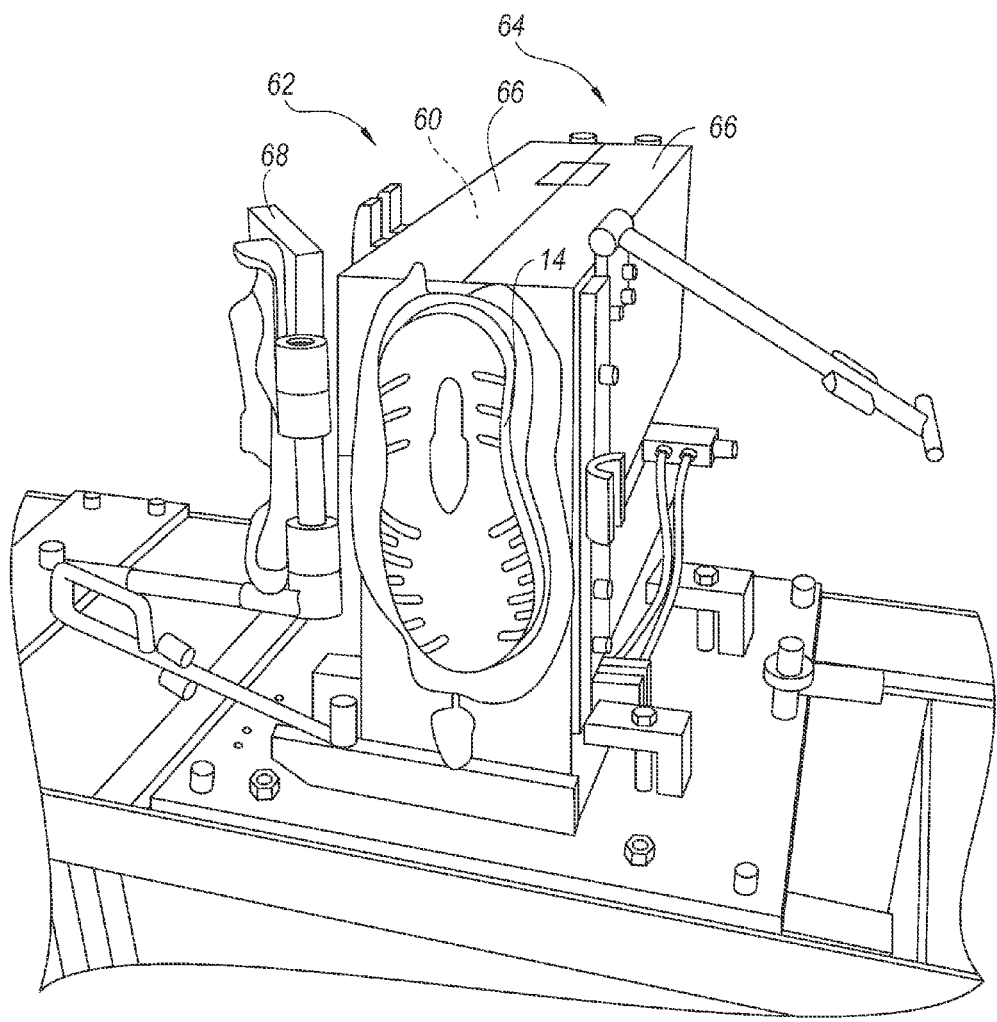
FIG. 10 is an isometric view of the mold assembly of FIG. 9 shown in a partially closed position.

The boot assembly 10 of the illustrated embodiment is manufactured by forming the entire neoprene sock 24 having the selected inner layer 26 and the outer layer 28. In the illustrated embodiment, the outer layer 28 is a layer of Spandera™ that includes a camouflage pattern, but other outer layers can be used. The neoprene sock 24 is securely positioned over a rigid last 60 of a mold assembly 62, shown in FIG. 9. The last 60 is connected to and extends from a vertical support 64 in a cantilevered arrangement. The mold assembly 62 includes a pair of side die plates 66 pivotally attached to the support 64. The side die plates 66 are movable from an open position (FIG. 9) and a closed position (FIG. 10). In the open position, the side die plates 66 are spaced away from the last 60 so as to expose and provide access to the last 60. In the closed position, shown in FIG. 10, the side die plates 66 enclose the last 60 and closely conform to the neoprene sock on the last.

The mold assembly 62 can be configured for use with neoprene socks having different thicknesses, such as for different models of the boot assembly. In one embodiment, the last 60 is sized and configured to receive the thickest neoprene sock in the different models of the upper. When a thinner neoprene sock is needed for a different model, a spacer can be placed on the last to accommodate for the thickness variations of the neoprene material. As an example, the mold assembly 62 of one embodiment is constructed for use with a neoprene sock 24 having a thickness of about 7 mm. The last 60 for the mold assembly 62 is for a predetermined foot size, such as a size US9, using the 7 mm sock. The same mold assembly 62 is also used for a boot having a neoprene sock with a 3.5 mm thickness, by inserting a 3.5 mm thick spacer (such as a spacer sock) on the last 60 before the 3.5 mm thick neoprene sock 24 is placed on the last. Accordingly, the 3.5 mm neoprene sock is slipped onto the last 60 over the spacer sock. In one embodiment, the spacer sock is a 3.5 mm thick neoprene spacer sock.

In this embodiment using the 3.5 mm thick neoprene sock over the last 60 and the spacer sock, the resulting boot assembly 10 will have a larger interior area than the boot with the 7 mm thick neoprene sock made using the same mold assembly 62. The mold assembly 62 is specifically designed, however, so that the boot with the 3.5 mm thick neoprene sock will be a larger size (e.g., approximately size US10) than the boot with the 3.5 mm thick neoprene sock (e.g., approximately size US9). Accordingly, the exact same mold assembly 62 can be used to make two different versions of a boot with different neoprene thicknesses and with different boot sizes. This decreases manufacturing costs by using the same mold assembly 62 during the injection molding of a plurality of models or versions of the boot assemblies without having to change or revise the mold, other than by using spacer socks or other spacer devices. Other embodiments include a plurality of molds with lasts that are specifically sized to accommodate neoprene socks having different thicknesses with out needing to use a spacer or the like.

The mold assembly 62 also has an outsole die plate 68 configured to securely retain and position the outsole 14 (FIG. 3) immediately adjacent to the bottom of the neoprene sock 24 (FIG. 3). The outsole die plate 68 of the illustrated embodiment is pivotally attached to the end portion of one of the side die plates 66. In one embodiment, the outsole die plate 68 can be removeable from the side die plate 66 and replaced with a different outsole die plate. This allows the mold assembly 62 to be used with different outsoles or different outsole patterns or materials. For example, a run of boots with a first construction or outsole pattern can be made using the mold assembly, and then outsole die plate 68 can be quickly and easily removed and replaced with a different outsole die plate. The mold assembly 62 with the new outsole die plate 68 can then be used to make another run of boots having different outsoles from those of the first run. In other embodiments, the outsole die plate 68 can be changed to modify the configuration (i.e., thickness, arrangement, distribution, etc.) of the integrated PU midsole portion 29 without having to use a completely different mold. The removeable outsole die plates 68 can also be configured to accommodated outsoles made of different materials. One outsole die plate 68 can be used with rubber outsoles, and another outsole die plate can be used for an injection molded outsole or an other type or style of outsole.

The outsole die plate 68 releasably locks onto the bottom of the other side die plate 66 when in the closed position to fully enclose the outsole 14 and the neoprene sock 24 within the mold assembly 62. The mold assembly 62 securely retains the neoprene sock 24 in a position so that the PU material can be injected into the mold so as flow over and cover only the selected portions of the outsole and neoprene sock, while the remaining portions of these components remain free of the injection molded PU materials. The mold assembly 62 is also configured to precisely hold the outsole 14 apart from the bottom panel of the neoprene sock 24 such that PU material will flow and fill the entire space between the sock's bottom panel and the outsole 14 to securely fix the outsole 14 to the upper 12. In at least one embodiment, the outsole 14 may include an adhesive material that adheres the outsole 14 directly to the bottom of the neoprene sock 24 as the PU material is injected into the mold and over the selected portions of the outsole 14 and the neoprene sock 24.

The side die plates 66 have contoured interior surfaces 70 that correspond in negative relief to the shape and arrangement of the boot assembly 10. For example, the contoured interior surfaces 70 have vamp, heel, ankle, and shin guard portions spaced a selected distance from the outer surface of the neoprene sock 24 in the corresponding vamp, heel, ankle and shin guard areas. Accordingly, during the injection molding process, the flowable PU material is injected into the mold assembly 62, when in the fully closed position, and uniformly flows over the selected outer surfaces of the neoprene sock 24 into only the spaces between the die plates 66 and the neoprene sock 24 to form the PU layer 24.

The contoured interior surfaces 70 of the side die plates 66 also include a plurality of ridges 72 in selected locations that define the flex grooves 51 and the convertible channels 52 in the PU layer 40 during the injection molding process. The contoured interior surfaces 70 also include one or more dam portions 74 that firmly and sealably engage the neoprene sock along the edges of the area to which the PU is allowed to flow. The dam portions 74 prevent the flowing PU material from bleeding onto the outer surface of the neoprene sock 24 that is to remain exposed and PU-free. The dam portions 74 must be carefully sized and controlled so as to press against the neoprene sock 24 firmly enough to prevent leakage of the PU material but not enough to crush and damage the neoprene material. In at least one embodiment, the dam portions 74 are carefully shaped and sized as a function of the characteristics of the PU material (i.e., the viscosity, etc.) and the characteristics of the neoprene material (i.e., its crush resistance) to ensure proper control of the flowing PU material without damaging the neoprene sock.

The dam portions 74 of the side die plates 66 also define the shape of the shin guard 42 and the necked down portion 44 between the bottom of the shin guard and the ankle portion of the upper 12. The side die plates 66 are configured at the shin guard area and the necked down area so that the PU material injected into the bottom of the mold assembly 62, when in the closed position, will smoothly and uniformly flow over the foot and ankle areas of the neoprene sock 42, and through the necked down portion and fully fill the space in the mold that defines the shin guard area. This shin guard area is shaped, sized, and configured in the diverging arrangement so that the injected PU material will consistently fill the entire space to form the entire shin guard 42 to the top edge of the neoprene sock without leaving any air holes, bubbles or other areas of incomplete dispersal of the PU material. Accordingly, the mold assembly 62 is configured for uniform repeatability of forming the boot assembly 10.

In operation, the empty mold assembly 62 is moved to the open position, and the neoprene sock 24 is securely positioned onto the last 60. An outsole 14 is positioned on the outsole die plate 68, and the mold assembly is moved to the closed position with the outsole die plate 68 and the side die plates 66 fully enclosing the neoprene sock. In this arrangement, the outsole 14 is also held in firm engagement with the bottom of the neoprene sock to allow a layer of adhesive to permanently adhere the two components together.

The mold assembly 62 is then locked in the closed position, and a selected volume of heated, flowable PU material is injected into the mold assembly at a selected rate so as to flow over and bond to only the desired areas of the neoprene sock 24 to form the PU layer. The PU material also flows around selected portions of the outsole 14 to help hold the outsole in place and to provide a smooth transition between the outsole 14 and the upper 12. The dam portions 74 on the die plates completely block the PU material from bleeding onto portion of the neoprene sock 24 that are to remain uncovered and exposed. The injected PU material is allowed to cure and cool, and then the mold assembly 62 is unlocked and moved to the open position to expose the boot assembly 10 on the last 60. The boot assembly 10 can then be removed from the last 60, and another neoprene sock 24 positioned on the last 60 in preparation for forming another boot assembly 10. This configuration allows all of the PU material to be applied to the neoprene sock in a single injection molding operation, which can greatly reduces manufacturing time and associated costs. Other embodiments, however, can include a manufacturing process wherein PU material may be injection molded onto various portions of the neoprene sock in more than one step.

If the boot assembly 10 being manufactured is the full-height, over-the-calf boot, the top edge of the upper 12 is finished, such as by binding stitching the top edge, after the boot assembly is removed from the mold assembly 62. A foot bed, insole, or other insert may be positioned into the interior area of the boot assembly after the boot assembly is removed from the mold assembly 62. If the boot assembly 10 being manufactured is a shorter model, the upper 12 can be cut along the selected convertible channel 52, such as the lower convertible channel 54, the 7-inch convertible channel 56, the 12-inch convertible channel 58, or another convertible channel. After the upper 12 has been cut along the selected convertible channel 52 to the desired height, the top edge of the upper's remaining portion is finished to complete the shorter, waterproof footwear assembly, such as the 4.5-inch "camp muc" shoe, the 7-inch boot, or the 12-inch boot. The upper portion of the neoprene sock 24 and any of the associated PU layer cut from the upper is manufacturing waste that can be recycled or thrown away.

In another embodiment, the boot assembly 10 made on the mold assembly 62 can include inserts between the neoprene sock 24 and a portion of the injection molded layer. For example, a shank can be positioned under the bottom of the neoprene sock as discussed above. Another embodiment can include a protective toe cap (i.e., a safety toe) that fits over the toe of the neoprene sock and is essentially encapsulated in the layer of injection molded material. Other embodiments can include other protective features such as a metatarsal guard, a puncture proof layer under foot, a snake guard layer associated with some or all of the upper, and/or other protective features.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A footwear assembly, comprising:
an outsole; and
an upper connected to the outsole, the upper comprising—
a sock layer having—
a leg portion having a front shin portion, side wall portions and a rear calf-side portion; and
a foot portion integrally connected to the leg portion and having a vamp portion; and
a unitary outer injection molded layer molded over at least a portion of the sock layer, wherein the unitary outer injection molded layer comprises—
a first injection molded region over the foot portion of the sock layer, wherein the first injection molded region defines an integrated midsole portion between the sock layer and the outsole; and
a second injection molded region over at least a portion of the shin portion of the leg portion of the sock layer, wherein the sidewall portions and calf-side portion of the sock layer remain substantially uncovered by the second injection molded layer, and wherein the second injection molded layer includes a shin guard integrally connected to the vamp portion.

2. The footwear assembly of claim 1 wherein the foot portion has a heel portion and an underfoot portion, the first injection molded region fully covers the heel portion, vamp portion and the under-foot portion, and wherein the first injection molded region covering the under-foot portion is between the sock layer and the outsole.

3. The footwear assembly of claim 1, further comprising a shank disposed between the sock layer and the outsole, wherein the first injection molded region is molded around the shank.

4. The footwear assembly of claim 1 wherein the upper further comprises at least one of a toe guard encapsulated by the first injection molded region, a metatarsal guard encapsulated in the first injection molded region, a puncture resistant insole disposed between a portion of the first injection molded region and the outsole, and a snake-guard layer coupled to the sock layer.

5. The footwear assembly of claim 1 wherein injection molded layer has a thickness of approximately 6.0 mm in the vamp portion and the shin guard.

6. The footwear assembly of claim 1 wherein the injection molded layer has a plurality of integral convertible channels of reduced thickness around the ankle portion, wherein the convertible channels define cut lines along which the upper may be cut during manufacture to define a selected height of the leg portion.

7. A lightweight, waterproof footwear assembly, comprising:
an outsole;
an upper connected to the outsole, the upper comprising—
a sock including a foot portion and a leg portion integrally connected to the foot portion, the leg portion having a front shin portion, side wall portions and a rear calf-side portion; and a unitary outer injection molded layer molded over the foot portion of the sock and a first portion of the leg portion of the sock while second portions of the leg portion remain substantially uncovered by the outer injection molded layer and the unitary outer injection molded layer is connected to the outsole; and wherein the injection molded layer covers the foot portion of the sock, and a portion of the injection molded layer extends under the foot portion and forms an integrated midsole portion attached to the outsole.

8. The footwear assembly of claim 7 wherein the injection molded layer is attached to the front shin portion and defines a shin guard integrally connected to the injection molded layer at the foot portion.

9. The footwear assembly of claim 7 wherein injection molded layer fully covers the foot portion of the sock.

10. The footwear assembly of claim 7 wherein the upper further comprises at least one of a toe guard encapsulated by the first injection molded region, a metatarsal guard encapsulated in the first injection molded region, a puncture resistant insole disposed between a portion of the first injection molded region and the outsole, and a snake-guard layer coupled to the sock layer.

11. The footwear assembly of claim 7 wherein the injection molded layer at the foot portion has a plurality of integral convertible channels of reduced thickness around the foot portion in a configuration conforming to a top edge of a boot, wherein the convertible channels define cut lines along which the upper can be cut during manufacture to define a top edge of a boot of a selected height.

12. A method of making a waterproof footwear assembly, comprising enclosing a neoprene sock in an injection molding assembly, wherein the neoprene sock comprises an interior area and an exterior surface facing away from the interior area, the neoprene sock having a foot portion integrally connected to a leg portion, the foot portion having a heel portion, a vamp portion and an under-foot portion, the leg portion having a front shin portion, side wall portions and a rear calf-side portion;

injecting a flowable, injection moldable material into the molding assembly adjacent to the foot portion of the neoprene sock;

forming an injection molded layer of the injection moldable material over a portion of the exterior surface of the neoprene sock, wherein the injection molded layer covers the foot portion and the front shin portion, and wherein the sidewall portions and the rear calf-side portion remain substantially uncovered by the injection molded layer; and molding the injection moldable material onto a portion of an outsole connecting the outsole to the neoprene sock, wherein an under-foot portion of the injection moldable material interconnects the neoprene sock to the outsole.

13. The method of claim 12 wherein the molding assembly has a last onto which the neoprene sock is removably attached, and the molding assembly has an enclosure portion with a necked down portion adjacent to the shin portion and the vamp portion of the neoprene sock, and wherein forming the injection molded layer includes injecting the injection moldable material into the enclosure portion adjacent to the foot portion of the neoprene sock and flowing the injection moldable material through the necked down portion and onto the shin guard portion to form in a single injection process that integrally forms the shin guard portion integral with the injection molded layer covering the vamp portion.

14. The method of claim 12 wherein forming the injection molded layer includes forming a plurality of convertible channels in the injection molded layers, wherein the convertible channels defining a plurality of cutting regions at different heights around the upper.

15. The method of claim 14, further comprising cutting the upper along a selected one of the convertible channels to reduce the height of the upper to form a shorter footwear assembly.

16. The method of claim 15 wherein cutting the upper along the selected one of the convertible channels provides a raw top edge of the upper, the method further comprising finishing the raw top edge.

17. The method of claim 12 wherein forming an injection molded layer of the injection moldable material includes pressing a portion of the mold assembly directly against an exterior surface of the neoprene sock and preventing the injection moldable materials from extending onto portions of the neoprene sock that are to remain uncovered and exposed.

18. The method of claim 12 wherein injecting the flowable, injection moldable material into the molding assembly includes injecting flowable polyurethane material into the molding assembly.

19. The method of claim 12, further comprising allowing the flowable, injection moldable material to solidify and cure after being injection molded onto the neoprene sock.

* * * * *